(12) United States Patent
Stinson

(10) Patent No.: US 8,007,571 B2
(45) Date of Patent: ***Aug. 30, 2011

(54) SYSTEM FOR SEPARATING A WASTE LIQUID FROM A PRODUCED GAS AND INJECTING THE WASTE LIQUID INTO A WELL

(76) Inventor: Donald Leo Stinson, Laramie, WY (US)

( * ) Notice: Subject to any disclaimer, the term of this patent is extended or adjusted under 35 U.S.C. 154(b) by 297 days.

This patent is subject to a terminal disclaimer.

(21) Appl. No.: 12/196,916

(22) Filed: Aug. 22, 2008

(65) Prior Publication Data

US 2008/0302012 A1    Dec. 11, 2008

Related U.S. Application Data

(62) Division of application No. 11/674,083, filed on Feb. 12, 2007.

(51) Int. Cl.
*B01D 53/14* (2006.01)

(52) U.S. Cl. .............. 95/228; 95/229; 95/231; 95/235; 95/236

(58) Field of Classification Search ............... 48/127.3; 95/235–236, 228–229, 231; 62/611, 620, 62/617–618; 166/267
See application file for complete search history.

(56) References Cited

U.S. PATENT DOCUMENTS

| | | |
|---|---|---|
| 4,061,481 A | 12/1977 | Campbell et al. |
| 4,140,504 A | 2/1979 | Campbell et al. |
| 4,157,904 A | 6/1979 | Campbell et al. |
| 4,171,964 A | 10/1979 | Campbell et al. |
| 4,252,548 A | 2/1981 | Markbreiter et al. |
| 4,278,457 A | 7/1981 | Campbell et al. |
| 4,441,900 A * | 4/1984 | Swallow .................. 62/622 |
| 4,449,994 A | 5/1984 | Hegarty et al. |
| 4,475,347 A * | 10/1984 | Hegarty et al. ............ 62/635 |

(Continued)

FOREIGN PATENT DOCUMENTS

WO    WO 2007/092666    8/2007

OTHER PUBLICATIONS

Moritis, New Companies, Infrastructure, Projects Reshape Landscape for CO2 EOR in US, Oil & Gas Journal, May 14, 2001, p. 68-71, Penn Well Corporation.

(Continued)

*Primary Examiner* — Duane Smith
*Assistant Examiner* — Ives Wu
(74) *Attorney, Agent, or Firm* — Holme Roberts & Owen LLP

(57) ABSTRACT

Produced natural gas containing carbon dioxide is dehydrated and chilled to liquefy the carbon dioxide and then fractionated to produce a waste stream of liquid carbon dioxide and hydrogen sulfide. Natural gas liquids may be first separated and removed before fractionation. After fractionation, the waste stream is pressurized and transmitted to a remote injection well for injection either for disposal of the waste stream and preferably to urge hydrocarbons toward the producing well. A hydrocarbon stream proceeds from fractionation to a methanol absorber system which removes carbon dioxide gas. The hydrocarbon stream is thereafter separated into at least hydrocarbon gas, nitrogen and helium. Some of the nitrogen is reintroduced into a fractionation tower to enhance the recovery of hydrocarbons. A methanol recovery system is provided to recover and reuse the methanol. The hydrocarbons are sold as natural gas and the helium is recovered and sold. Excess nitrogen is vented.

6 Claims, 4 Drawing Sheets

U.S. PATENT DOCUMENTS

| | | | |
|---|---|---|---|
| 4,511,382 A | 4/1985 | Valencia et al. | |
| 4,533,372 A | 8/1985 | Valencia et al. | |
| 4,923,493 A | 5/1990 | Valencia et al. | |
| H000825 H * | 10/1990 | Green | 62/632 |
| H000826 H * | 10/1990 | Willis et al. | 508/551 |
| 5,062,270 A | 11/1991 | Haut et al. | |
| 5,120,338 A | 6/1992 | Potts et al. | |
| 5,141,544 A | 8/1992 | Butts | |
| 5,157,925 A | 10/1992 | Denton et al. | |
| 5,257,505 A | 11/1993 | Butts | |
| 5,265,428 A | 11/1993 | Valencia et al. | |
| 5,375,422 A | 12/1994 | Butts | |
| 5,775,128 A | 7/1998 | Drnevich et al. | |
| 5,852,061 A | 12/1998 | Alexion et al. | |
| 5,950,453 A | 9/1999 | Bowen et al. | |
| 5,956,971 A | 9/1999 | Cole et al. | |
| 7,152,430 B1 | 12/2006 | Parro | |
| 7,155,931 B2 | 1/2007 | Wilkinson et al. | |
| 7,191,617 B2 | 3/2007 | Cuellar et al. | |
| 7,204,100 B2 | 4/2007 | Wilkinson et al. | |
| 7,210,311 B2 | 5/2007 | Wilkinson | |
| 7,467,660 B2 | 12/2008 | Steinberg | |
| 7,806,965 B2 * | 10/2010 | Stinson | 95/187 |
| 7,883,569 B2 * | 2/2011 | Stinson | 95/181 |
| 2002/0007733 A1 | 1/2002 | Morrow | |
| 2006/0283207 A1 | 12/2006 | Pitman et al. | |
| 2007/0180855 A1 | 8/2007 | Butts | |
| 2008/0302240 A1 * | 12/2008 | Stinson | 95/42 |
| 2008/0307966 A1 * | 12/2008 | Stinson | 95/187 |

OTHER PUBLICATIONS

Gas Processes, Hydrocarbon Processing, May 2002, p. 63-122, Gulf Publishing Co., Houston, TX.

Lynch et al., How to Compare Cryogenic Process Design Alternatives for a New Project, 86th Annual Convention of the Gas Processors Ass'n, Mar. 12, 2007, San Antonio, TX.

International Search Report for PCT/US08/53631, Natural Gas Processing System, Inventor: Donald Leo Stinson.

Written Opinion of the ISA for PCT/US08/53631, Natural Gas Processing System, Inventor: Donald Leo Stinson.

Schendel, Process Can Efficiently Treat Gases Associated With CO2 Miscible Flood, Oil and Gas Journal, Jul. 18, 1983, PennWell Publication.

Field Demonstration of Carbon Dioxide Miscible Flooding in the Lansing-Kansas City Formation, Central Kansas, CO2 EOR Technology, Mar. 2006, p. 24-25, U.S. Dept of Energy—Office of Fossil Energy.

Damon et al., Low-Quality Natural Gas Sulfur Removal/Recovery, Fuels Technology Contractors Review Meeting, Nov. 16, 1993, Morgantown, WV.

Esteban et al., Exploit the Benefits of Methanol, Proceedings of 79th GPA Annual Convention, 2000, Gas Processors Association, Atlanta, GA.

McIntyre et al., Hydrate Inhibition with Methanol—A Review and New Concerns Over Experimental Data Presentation, Proceedings of 83rd GPA Annual Convention, 2004.

Bullin et al., Optimizing Methanol Usage for Hydrate Inhibition in a Gas Gathering System, Proceedings of 83rd GPA Annual Convention, 2004.

Kidnay et al., Fundamentals of Natural Gas Processing, 2006, p. 25, 27, 29, 93, 121, 329, CRC Press, Boca Raton, FL.

CO2 Floods: Frequently Asked Questions, at http://www.kindermorgan.com/business/co2/flood.cfm, Kinder Morgan (last visited Dec. 16, 2008).

William C. Lyons, Ph.D., P.E., Gary J. Plisga, B.S., Standard Handbook of Petroleum & Natural Gas Engineering, Second Edition, 2005, 5.11 Enhanced Oil Recovery Methods, pp. 5-211 to 5-225.

P. Scott Northrop, with ExxonMobile Upstream Research and Rene F. Bialek, with Imperial Oil Resources, Cryogenic Sour Gas Process Attractive for Acid Gas Injection Applications, Mar. 11, 2004, pp. 1-18.

Karen Bybee, Cryogenic Technology for Processing High-CO2 and -H2S Gas Reserves, JPT, Production/Facilities, Dec. 2008, pp. 87-90.

J.A. Valencia, P.S. Northrop, and CJ Mart/ExxonMobile Upstream Research Company, Controlled Freeze Zone Technology for Enabling Processing of High CO2 and H2S Gas Reserves, IPTC, 2008, pp. 1-6.

United States Statutory Invention Registration, Reg. No. H825, Published Oct. 2, 1990, Inventors, Green, et al.

* cited by examiner

SYSTEM FOR SEPARATING A WASTE LIQUID FROM A PRODUCED GAS AND INJECTING THE WASTE LIQUID INTO A WELL

PRIORITY CLAIM

This divisional application claims the benefit of and priority from U.S. patent application Ser. No. 11/674,083 with a filing date of Feb. 12, 2007, which is hereby incorporated in its entirety and for all purposes by this reference.

BACKGROUND OF THE INVENTION

1. Field

This invention relates to the processing of produced gases from a producing well and more particularly to processing the produced gases to concentrate the hydrocarbon gas and to separate hydrocarbon gas, other useable gases or liquids, certain unusable gases including waste gases, and to place the waste gases in a suitable form for injection into an injection well separate from the producing well.

2. The Relevant Technology

Natural gas is widely used today for home heating and cooking. As used herein, the term "natural gas" means a variety of hydrocarbon gases that are produced from a well (i.e., a producing gas well) drilled or bored into the ground or earth. Produced gas is extracted from the producing well and may be processed at the wellhead to remove certain contaminants. Thereafter, it is sent by pipeline to a gas processing facility. The produced gas being delivered is a mixture of gases and, depending on the produced gas obtained, possibly some natural gas liquids (NGL) that are separated for use as a separate source of hydrocarbon products. The produced gas after removal of NGL may include in various proportions or quantities of one or more of methane ($CH_4$) and other hydrocarbon gases such as ethane ($C_2H_6$) and propane ($C_3H_8$), as well as carbon dioxide ($CO_2$), nitrogen ($N_2$), helium (He), hydrogen sulfide ($H_2S$), other gases, and water. The produced gas may also include smaller amounts of other materials such as particulates and liquids entrained in the gas. The mixtures vary typically based on the well, the geologic formation from which the well is producing, and the geographic area where the well is located (i.e., the "field").

The gas processing facility receives a stream of produced gas from any one of several sources of produced gas including one or more pipelines which may be connected to receive gas from one or more producing wells owned or controlled by different parties or from one or more storage structures. The gas processing facility operates to separate useable gases from the unusable gases, and to remove natural gas liquids, if any. The usable gases include the desired hydrocarbon gases like methane, which are concentrated and separated from the unusable gases like carbon dioxide and hydrogen sulfide. The desired hydrocarbon gases are then separated from other gases and directed to a suitable pipeline for delivery to users. Also, some other gases in the produced gas may have commercial value such as, for example, helium, and those are separated and recovered for sale. The unusable gases are disposed in some cases by venting or flaring.

In some applications, carbon dioxide and nitrogen have been separated from the produced gas and sold for commercial use. Economic conditions and other factors, however, are such that carbon dioxide and nitrogen are being vented to the atmosphere and not recovered.

A variety of processes have been developed for processing streams of gases including produced gas. For example, processes are available for drying gas, for removing contaminants, for separating the different gases in a stream, for concentrating certain gases and for gas effluent cleanup. A number of available processes are summarized in HYDROCARBON PROCESSING, May 2002 (Gulf Publishing Co.), (Gas Processes 2002 at pages 63-122). Suitable processes for treating streams of produced gases are described at pages 80 and 81.

Venting hydrogen sulfide gas into the atmosphere is not desired because it has an unpleasant scent or odor. Venting carbon dioxide may be deemed to be ecologically unsuitable or undesirable particularly in the quantities that may be involved in the processing of produced gas from a producing well.

Disposing of the carbon dioxide gas into an injection well is a recognized practice. Using the carbon dioxide gas to stimulate production from producing wells is also known. But processes to rapidly remove and dispose of unusable gases like carbon dioxide and hydrogen sulfide are not known. Rapid and ecologically acceptable disposal of waste gases including carbon dioxide separated from a produced gas in a manner to enhance producing well production are also not known particularly.

BRIEF SUMMARY OF THE INVENTION

Produced gas is first obtained from any suitable source such as a producing well, a pipeline, or a storage structure. The produced gas is converted or processed into a useful hydrocarbon gas by processing the produced gas to separate the hydrocarbon gas from at least one waste gas produced with the hydrocarbon gas. A waste gas or waste material is any gas or material that is in the produced gas and desirably not released to the atmosphere and of the type that is preferably disposed of in an ecologically acceptable manner. The hydrocarbon gas is supplied as the output of the process while the recovered waste gas is supplied to an injection well as a liquid for disposal. The injection well is preferably spaced from the producing well. An injection well may be drilled to receive the waste gas as a liquid. or it may be a well converted from other uses to receive the waste gas as a liquid. Preferably, the waste gas, such as carbon dioxide, is inserted now in liquid form into the injection well and delivered to a suitable formation, and to a desired stratum in that formation, for disposal.

A preferred process for converting the produced gas into a useful hydrocarbon stream includes first dehydrating the produced gas to the extent it contains water in some form. In a more preferred process, the dehydrated produced gas is cooled next in sequence following dehydration. The cooled and dehydrated produced gas is then processed into a first stream containing desired hydrocarbons and a second stream containing waste gases in liquid form. The process preferably includes fractionation of the dehydrated and cooled produced gas into the first stream and the second stream which is effected next in sequence after cooling. In more preferred applications, the produced gas is cooled to a temperature in which at least some of the waste gas such as carbon dioxide is in liquid form.

The produced gas includes a hydrocarbon gas such as methane. The produced gas also may include a plurality of other gases such as nitrogen and waste gases such as carbon dioxide and hydrogen sulfide.

In preferred processes, the produced gas is separated and preferably fractionated into a first stream and a second stream. The first stream includes the hydrocarbon gas such as methane together with helium, nitrogen and some of carbon dioxide as a gas. The second stream includes waste gases such as carbon dioxide as a liquid. The second stream may also include other waste gases such as hydrogen sulfide also not in liquid form.

In preferred processes, the first stream is further processed to remove the carbon dioxide gas. The carbon dioxide gas recovered from the first stream is then returned and incorporated with the produced gas being fractionated so that it may be incorporated into the second stream. The first stream, upon removal of the carbon dioxide, is thereafter further processed and preferably fractionated into outputs of hydrocarbon gas, helium, methane and nitrogen.

In more preferred systems, the first stream is processed through a methanol absorber in which the methanol absorbs the carbon dioxide. The methanol with absorbed carbon dioxide is thereafter processed to separate the carbon dioxide and methanol. The carbon dioxide is returned for incorporation with the produced stream for further fractionation and incorporation into a stream of waste gas. The methanol is recovered and reused.

In alternate processes, the produced gas is supplied to an inlet system to effect dehydration. The dehydrated produced gas is thereafter supplied to a heat exchanger to cool the produced gas promptly after dehydration. Separation of the dehydrated cooled gas is thereafter effected promptly, preferably by fractionation, to extract any hydrogen sulfide and carbon dioxide for injection into an injection well as a liquid rather than a gas.

After separation, the hydrogen sulfide and carbon dioxide liquid are pressurized for transmission to the injection well and for injection. The injection well is located preferably away from the producing well a distance such as, for example, one mile to three miles. The distance, however, may vary from less than one mile to several miles. The injection well is configured so that the second stream is inserted at a stratum or strata selected to receive and retain the second stream. It should be understood that it may be introduced into several stratums and into several strata at one time. In preferred arrangements, the second stream will be inserted into an injection well in a field and at a stratum or in strata to act as a force to urge hydrocarbons to move away from the injection well. Assuming there is at least one producing well nearby, it is believed that some recoverable hydrocarbons will be urged toward the producing well. In a field with multiple producing wells positioned about the injection well, the second stream urges hydrocarbons toward multiple wells in the field.

In more desired processes and systems, a methanol system is used to remove carbon dioxide entrained in the first stream after fractionation. A separate methanol recovery system is used to recover and reuse the recovered methanol.

In alternate processes and systems, the produced gas is processed in a fractionating tower which operates to supply a stream with hydrocarbons at a first outlet at the top of the fractionating tower. The tower has a top and a bottom and is most preferably configured to receive a stream of nitrogen proximate to the bottom to enhance the recovery of methane at the top of the tower.

In preferred processes and systems, heat exchanger means is used to receive the produced gas and cool it and to effect heat transfer to and from other streams in the process. In some systems and processes, the produced gas is cooled to a temperature in which some gases like carbon dioxide are in liquid or substantially in liquid form. An inlet system is preferably provided to dehydrate the produced gas before cooling.

After dehydration and cooling, the produced gas is preferably supplied to processing means that desirably includes a fractionation tower operable to separate the cooled and dehydrated produced gas received from the heat exchanger into a stream containing hydrocarbons and a stream containing waste gas. The processing means also preferably includes a separator system which is operable to separate carbon dioxide from the stream with recoverable hydrocarbons. The separator system is most preferably a methanol absorber connected to receive the stream with the hydrocarbons. The methanol absorbs the carbon dioxide in the stream containing hydrocarbons. The methanol with carbon dioxide is then preferably supplied to a methanol recovery system which is operable to separate said carbon dioxide stream into carbon dioxide and methanol. The carbon dioxide is then preferably returned for incorporation with the produced gas and the methanol is reused.

In preferred processes and systems, the stream with the hydrocarbons is also connected to a nitrogen rejection unit which separates nitrogen and helium from the hydrocarbons in the stream. The hydrocarbons are directed to an outlet for further connection to pipelines for distribution to customers. The helium and the nitrogen are supplied to separating systems to recover the helium as a commercial product and to separate nitrogen which may be sold commercially or it may be vented or it may be returned to and inserted into the fractionating tower to enhance methane recovery.

These and other features and functions of the present inventions will become more fully apparent from the following description and the appended claims.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
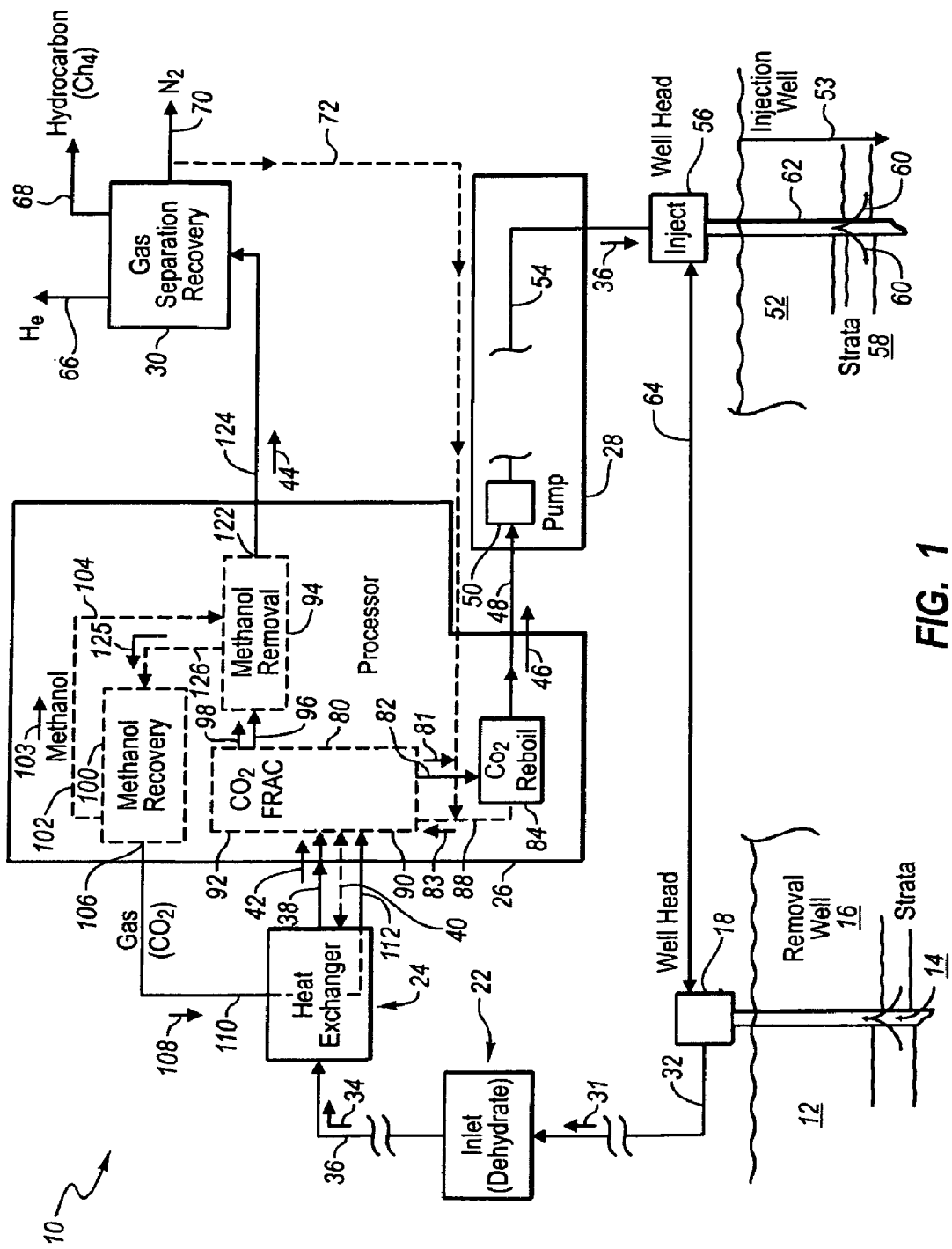
FIG. 1 is a block diagram illustrating a system for processing gas from a producing well into a separate gas stream and for injecting the waste gas as a liquid into an injection well optionally proximate a producing well.

"Natural gas" means a gas that includes useable hydrocarbons like methane. It is recoverable from one or more ground wells or producing wells in a field the dimensions of which vary but which often involve many square miles of surface. The producing wells are positioned over a geological formation that contains the desired hydrocarbons. In fields of multiple wells, the producing wells are drilled into the gas producing underground geological formations and are spaced apart. Upon extraction at the wellhead, the produced gas is typically contaminated with water and water vapor along with some entrained particulates and even other fluids. In some cases, wellhead equipment removes entrained liquids and particulates. For example, filters and cyclone separators may be used proximate the wellhead to remove particulates and water from the produced gas and supply a relatively clean stream of produced gas to a suitable pipeline for delivery to a gas processing facility. The produced gas from several wells may be supplied to the gas processing facility in one or more pipelines. In addition, the produced gas may be temporarily stored in a suitable storage structure before delivery to the gas processing facility. The gas processing facility receives produced gas from what may be regarded as a suitable source. The produced gas may include, in addition to the desired hydrocarbon gas, large quantities of carbon dioxide, some hydrogen sulfide, notable quantities of nitrogen, some NGL, and some helium. The NGL, if present, are removed before processing the produced gas. The exact mix or combination of gases that constitute the produced gas varies from well to well and from field to field and also over time. The hydrocarbons are typically regarded as usable gas. Other gases like helium may also be recovered and thus may be regarded as or deemed to be a usable gas. Other gases like nitrogen and carbon dioxide for this application are not usable. Some unusable gases such as carbon dioxide and hydrogen sulfide that may be regarded as pollutants are referred to herein as "waste gas."

After any processing at the wellhead, the produced gas is supplied to a gas processing facility which is typically constructed reasonably proximate to a field yielding the produced gas. The gas processing facility is assembled to first remove any NGL and then separate the produced gas into suitable streams of useful hydrocarbon or natural gas and useful streams of other commercially viable gases. Other gases of little or no commercial value are vented or flared. For example, today, nitrogen may be sellable or it may be vented when the cost of transport would make it too expensive. Similarly, carbon dioxide has been recovered and sold for commercial use. However the economic value of carbon dioxide has changed so it is now in many cases vented to the atmosphere. However the amount vented is quite significant. For example, a gas processing facility of modest size may today vent tons of carbon dioxide every day.

FIG. 1 is a simplified block diagram of a gas processing system 10 in which the hydrocarbon yield from a producing well 12 is maximized while venting no gases to the atmosphere and preferably at the same time using the waste gases to enhance recovery of hydrocarbons from the producing well or the recovery field and to increase the recovery from the produced gas being processed. As depicted, a removal or producing well 12 in a field is drilled to recover gas 14 from an underground formation 16. The gas 14 is processed at the wellhead 18 and then supplied by pipeline 32 to a gas processing system 10. It should be understood that multiple producing wells 12 may be connected to supply produced gas to the gas processing system like the system 10.

As shown in FIG. 1, the gas processing system 10 has an inlet system 22, a heat exchanger 24, a processor 26, an injection system 28, and a second gas separation system 30. Turning first to the inlet system 22, it receives produced gas 31 through pipeline 32. The produced gas 14 can be expected to have considerable water entrained as it arrives at the wellhead 18. Depending on the well and field, a cyclone separator or similar dewatering arrangement (not shown) may be provided at the wellhead 18 to remove entrained water, leaving some water vapor in the produced gas 31 being supplied from the wellhead 18. Removing the entrained water is preferred to reduce the erosive effects of the moving water on the pipeline and also to reduce corrosion.

The produced gas 31 is supplied to the inlet system 22 which operates to reduce the water content of the produced gas 31. The water content of the produced gas 31 from the wellhead may vary from 1% to over 15%. Absent dehydration, gas with a high water content will be very erosive and corrosive. As it encounters turns or other flow interferences in pipes, some of the water can be expected to plate out or condense into droplets. At high velocity, the droplets can become quite erosive. Also some of the gases (e.g., hydrogen sulfide) may go into solution in the water creating an acid that is quite corrosive.

The inlet system 22 reduces the water percentage of the produced gas 31 to a small percentage of the total gas. Preferably, it reduces the water content of the produced gas from the wellhead 31 to less than 1% and more preferably less than about 0.02% by weight or volume. The less water in the system thereafter in any form including vapor, the better.

A number of suitable systems are known for dehydrating including for example, a DRIGAS system, a Drizo gas dehydration system and an Eco Tag system. See HYDROCARBON PROCESSING, May 2002 (Gulf Publishing Company), at pages 65 and 66. While glycol based systems are known, other systems may be used as desired. Molecular sieve systems are also now being used for dehydration.

After processing through the dehydration system 22, dehydrated produced gas 34 (see Table 1) is supplied by a suitable pipe 36 to the heat exchanger 24. The heat exchanger 24 functions to exchange or transfer heat from one fluid or gas to another fluid or gas. As discussed hereinafter, the heat exchanger 24 that is preferred is configured to transfer heat to and from several different fluid streams to in effect conserve the heat energy or cold energy and thus minimize the need for a separate source of cooling or a separate source of heat.

Typical heat exchangers come in a wide variety of sizes, shapes and flow configurations. To accomplish the exchange, the heat exchanger is constructed of materials that have a good heat transfer coefficient. The heat exchanger is configured to position one fluid relative to another in pipes or other suitable flow channels so that heat can transfer from one fluid to the other through a pipe that is configured or selected to maximize heat transfer. Given the flow rate and temperature range of the inlet fluid and the desired temperature and flow rate of the outlet fluid, one can calculate the amount of heat to be transferred and in turn determine the size, configuration, and shape of the exchanger given known characteristics of the fluid that is to receive or to be the source of the heat or cold. Heat exchangers can be configured to position the two fluids to flow in different ways such as cross flow, counter flow, parallel flow, or circular flow, including combinations and variations thereof to affect the efficiency and speed of the heat transfer.

The heat exchanger 24 here functions to cool the warm inlet produced gas 34 from a temperature that is ranging from about 80° F. to about 140° F. to a cooled produced gas at a temperature of about −38° F. (38 degrees below zero, Fahrenheit). Inasmuch as the temperature of the produced gas 31 from the wellhead 18 will vary based on many factors including the outside air temperature, daylight/sunlight and flow rate, the heat exchanger 24 may include means to regulate the heat exchange rates of one or more fluids to create a stable temperature profile for the various streams of fluids in the process. This can be accomplished by sensors monitoring temperatures and mechanisms connected to the temperature monitor to, for example, mechanically vary the number of tubes of a tube bundle of a typical heat exchanger 24 or a flow control valve positioned proximate the inlet to the heat exchanger 24 to regulate the flow either on the inlet side or the discharge side of the heat exchanger 24 of one or more of the various streams passing through the heat exchanger 24, which streams are discussed hereinafter.

In the system 10 of FIG. 1, it is desired to lower the temperature of the dehydrated produced gas 34 rapidly and dramatically after dehydration to a temperature in which selected gases like carbon dioxide condense. Indeed, at −38° F. it is expected that a notable portion of the carbon dioxide (e.g., about 80%), along with the hydrogen sulfide (e.g., about 80%) and even some water, will condense to a liquid. As a liquid, removal is facilitated. Because the liquids are erosive and corrosive, the pipe 38 from the heat exchanger 24 to the processor 26 is short and may also be insulated to minimize heat gain to the cooled dehydrated produced gas 42. That is, the processor 26 is positioned as close as practical to the heat exchanger 24 to minimize the length 40 of the pipe 38 which is delivering the cooled dehydrated produced gas 42 with waste gases like liquid carbon dioxide entrained.

The processor 26 functions to separate the cooled dehydrated produced gas 42 into stream 44 which contains the desired hydrocarbon gas or natural gas, sometimes called a hydrocarbon stream, and a second stream 46, or waste stream, that contains unusable components and is sometimes called the waste stream or the carbon dioxide stream. That is, undesired or waste materials are separated into another, or second, stream 46 and processed for subsequent disposal.

The second stream 46 is supplied to an injection system 28 via pipe 48. The injection system 28 is so denominated because it is in substance and effect taking liquid that was extracted from the production gas and putting it in condition for injection back into the ground rather than in condition for venting. In FIG. 1, the injection system 28 includes a pumping means that may be one or more pumps like pump 50. The pumping means such as pump 50 operates to raise the pressure of the second stream 46 to a suitable pressure for transmission to an injection well 52 and even for injection into the well. The injection system 28 includes a pipeline 54 that extends from the pumping means to the wellhead 56 of the injection well. That is, a well 52 is drilled into the ground and down into a stratum 58 that will accept liquid. The pressurized second stream 60 is supplied to the wellhead 56 which is configured with suitable protector valves and other wellhead structure to direct the pressurized second stream 60 down the well casing 62. The well casing 62 is configured in length to direct the pressurized second stream 60 into the stratum 58. While FIG. 1 depicts the stratum 58 and the injection well in two dimensions, it should be understood that in fact the stratum surrounds the well casing 62 in all directions. Thus, the injection is effected in all directions around the well.

In the production of oil and gas, it is known to inject gases and liquids into an injection well either to dispose of the gas or liquid or to stimulate production by urging hydrocarbons toward a producing well. Injection wells may be drilled expressly for such a purpose. An existing well that was a producing well may be converted to such a purpose. However, rapidly forming a liquid stream of waste gases into a liquid stream from production gas and injecting the waste liquids into an injection well for disposal or for stimulating production is not known.

The injection well 52 may also be positioned at some distance from or spaced from the producing well 12 preferably in the same field. While preferably in the same field, the liquid waste is pressurized and thus may be supplied substantial distances to other fields for injection into an injection well and disposal. The spacing or distance 64 is here shown selected to position the injection well 52 in the same field of the hydrocarbon yielding formation of the producing well 12. That is, the injection well 52 is positioned and drilled to a depth 53 to access the hydrocarbon yielding formation of the strata 16 of the producing well 12. Injection of the pressurized second stream 60 into the injection well 52 and into the stratum 58 that is comparable to or part of the hydrocarbon yielding formation 16 will introduce material that will migrate. The migrating fluid 60 is expected to displace and thereby urge hydrocarbons to move away from the injection well 52 and in turn toward any one or more nearby producing wells like producing or removal well 12. In other words, the second stream 60 is under pressure and will be urged into and through the stratum 58. The distance 64 between the producing well 12 and the injection well 52 is determined by the formation or field and may range from about a few hundred yards to several miles (e.g., more than 5 miles) and even across a large field.

The injection well 52 may be simply an exhausted well (i.e., not producing natural gas or other hydrocarbons) or a new well that is drilled to be relatively accessible and of such a type that the second stream under pressure 60 can be injected into one of several strata for retention in the well.

In the system 10 at hand, the produced gas 31 contains methane ($CH_4$) in addition to traces of other hydrocarbons such as ethane ($C_2H_6$) and propane ($C_3H_8$). It also contains quantities of carbon dioxide ($CO_2$), nitrogen ($N_2$) and Helium (He). Hydrogen sulfide ($H_2S$) is also found in the example, but in small quantities. Even though the quantity is small, the hydrogen sulfide is very corrosive so that removal is desired. In some fields, the ratios of the gases will vary and other gases may be found at the same time. For example, various sulfur compounds are known to contaminate some streams of produced gas from other fields.

In all cases, the processor 26 is configured to separate the cool dehydrated produced gas 42 to remove as promptly as possible the undesired components of the cool, dehydrated produced gas 42. Thus, processes are employed to remove the hydrogen sulfide, as it is an acid when combined with any residual water or moisture. Removal early in the process avoids or reduces the corrosive effect of any of the acid on system structure. Residual water is also reduced immediately for similar reasons. While carbon dioxide can have commercial applications, it is now widely available commercially so that recovery for commercial sale is not provided for in the system 10. Rather, carbon dioxide is viewed as an undesired non-hydrocarbon and even as a pollutant because of reported association of that gas with global warming. Thus, the processor 26 is configured to strip out as much of the carbon dioxide as possible and supply it to an injection well as a liquid for injection. Thus, the system 10 does not release the carbon dioxide to the atmosphere, thereby enhancing the economics of the processing operations to the extent there is a cost connected with the venting to the atmosphere of the carbon dioxide. In other words, the system 10 is operated to separate the carbon dioxide and the hydrogen sulfide into the second stream 46 that is returned to the earth from which it came so it does not pollute the atmosphere. Of course, the waste or second stream 46 is preferably injected in a position in a well 52 to increase the recovery from the producing well 12 and even more preferably a plurality of producing wells in a field.

The first stream 44 contains the desired hydrocarbon gas plus helium and nitrogen. The first stream 44 is further processed by the separate gas separation or recovery systems 30 to recover the helium at an output 66 for commercial sale and to recover the hydrocarbon gas at an output 68 for commercial sale. The nitrogen, while also useful commercially, is widely available. Thus, it is vented 70 to the atmosphere. In some applications a portion of the nitrogen is returned via line 72 to the processor 26 to enhance methane recovery as discussed hereinafter.

The processor 26 is preferably arranged to employ a fractionation tower 80 configured and operated principally to separate out the carbon dioxide and hydrogen sulfide at its discharge 82. The carbon dioxide and hydrogen sulfide is passed through a reboiler 84 in which the inlet stream is raised in temperature sufficient to liberate gases to be recovered. In systems like system 10 in which the produced gas includes natural gas liquids (NGL), a separate fractionation step may be added after the discharge 82 to remove the NGL from the stream 81. Steps would be taken to control the temperature and keep it low enough, however, so that the second stream 46 exits in a pipe 48 as a liquid. The reboiler 84 may be a heat exchanger that recovers heat from another stream in the system 10 such as a propane stream; or it may be provided with a separate source of heat such as an electric coil. Alternately, and preferably, the heat is provided to the reboiler 84 by supplying condensing fluid from the methanol stripper condenser 166 via line 178 as discussed hereinafter. The cooled condensing fluid is returned to the condenser 166 using a pump (not shown) via line 179. The reboiler 84 separates out additional recoverable gases 83 and supplies them through a recirculation line 88 from the reboiler 84 to the fractionation tower 80. The recoverable gases 83 are in effect reintroduced for additional processing or fractionation in the fractionation tower 80. Notably, the nitrogen line 72 is optionally connected to the recirculation line 88 to increase the supply of nitrogen into the fractionation tower 80 at or near the bottom of the fractionation tower 80. The fractionation tower 80 is oriented generally vertically with a bottom 90 and a top 92. In the fractionation process, the nitrogen has physical properties so that it rises from the bottom 90 and moves toward the top 92. The nitrogen is known to displace methane in the liquid in the fractionation tower 80 so that the additional nitrogen will enhance the recovery of the methane in the supply 98 to the methanol absorber 120.

The quantity of carbon dioxide in the cooled dehydrated produced gas 42 is quite significant and may be as much as about 65% to 70% by volume. In turn, not all of the carbon dioxide is removed in the fractionation tower 80 so that some remains in the output 98 which also includes the recoverable hydrocarbon gas (e.g., methane), nitrogen, and helium. The output 98 of the fractionation tower 80 is supplied optionally, but here preferably, to a methanol removal system 94 via supply line 96. The methanol removal system 94 is operated to scrub out the carbon dioxide in the output 98 so that the first stream 44 is virtually or essentially free of carbon dioxide.

In that methanol is valuable, the methanol removal system 94 supplies a methanol-carbon dioxide stream 125 to a methanol recovery system 100 which operates to separate the methanol and carbon dioxide. The methanol recovery system 100 has an output 102 to return the recovered methanol 103 back to the methanol removal system 94 via a return line 104. The methanol recovery system 100 also has a separate output 106 connected to supply the recovered carbon dioxide 108 through line 110 to the heat exchanger 24 for heating before reintroduction to the fractionating tower 80 via line 112.

Figure 2:
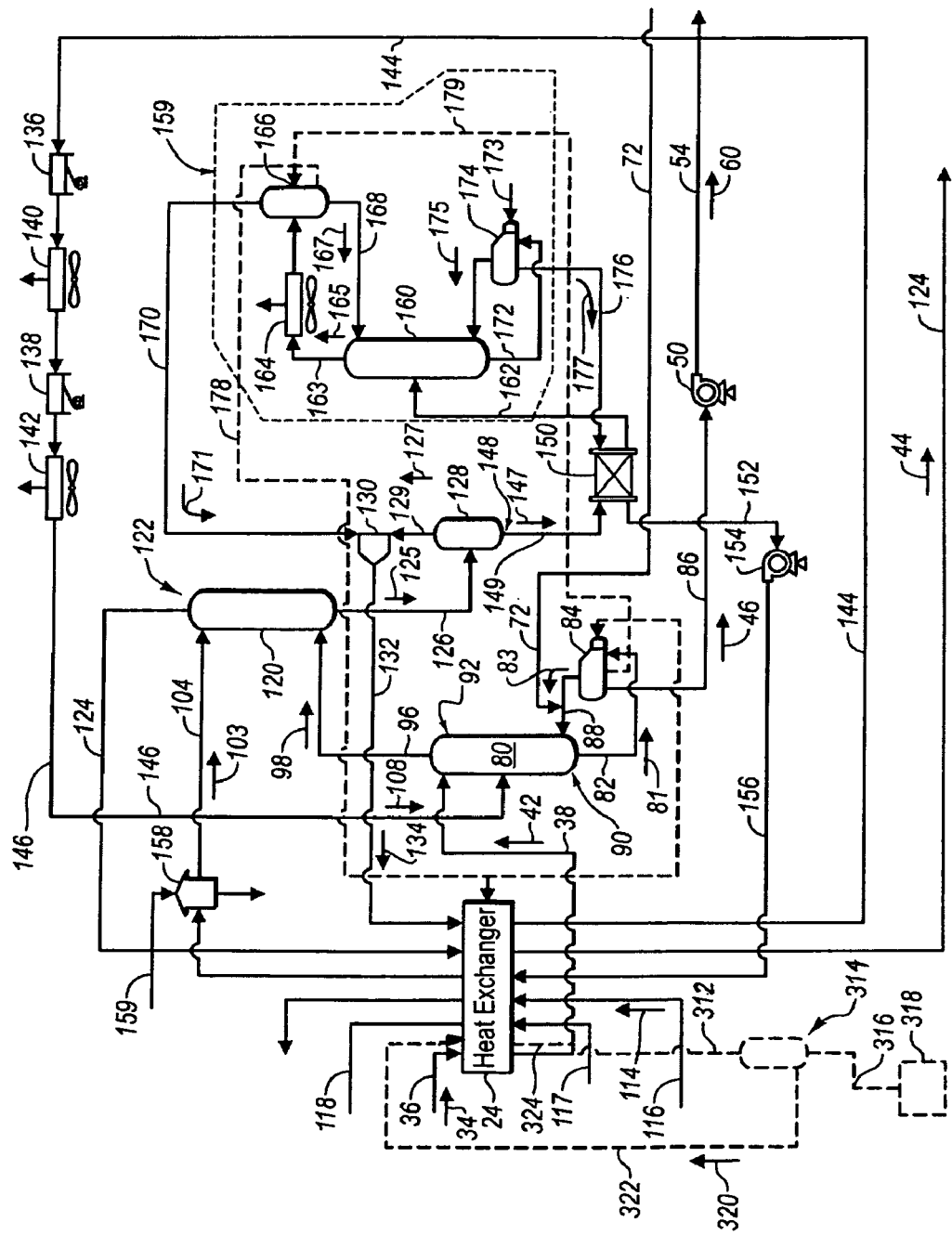
FIG. 2 is a partial more detailed system diagram of portions of the system of FIG. 1.

Turning to FIG. 2, a portion of the system of FIG. 1 is illustrated in greater detail. The dehydrated produced gas 34 (See Table 1) is supplied to the heat exchanger 24 where it is cooled largely by propane stream 114 supplied to the heat exchanger 24 via line 116 at a temperature at or about −43° F. (43 degrees below zero, Fahrenheit) and which leaves the heat exchanger 24 through line 118 at a temperature of about 88° F. Other fluid streams are heated and cooled in the heat exchanger 24 as discussed hereinbefore and hereinafter.

The cooled dehydrated produced gas 42 is supplied to the processor 26 and more particularly to the fractionation tower 80 of the processor 26. The fractionation tower 80 is configured to fraction or separate the cooled dehydrated produced gas 42 into a first stream and a second stream. The first stream has here been earlier identified as output 98 and may also be called a hydrocarbon stream. It is supplied via line 96 to a methanol removal system 94 and more particularly to a methanol absorber tower 120 as discussed hereinafter.

The fractionation tower 80 is a conventional fractionation tower that may be referred to as a 20 tray tower. It may be obtained from any of several steel tank or tower fabricators and is configured to contain 20 fraction trays. Such trays may be purchased from suppliers such as, for example, Jaeger Products, Inc. of Dallas and Houston, Tex. The fractionation tower 80 is typically constructed of high quality steel and is sized to process the expected volumes of material coming from one or more producing wells like well 12 (FIG. 1). While the fractionation process is shown here being effected in a 20 tray tower, other configurations or arrangements to effect the desired fractionation may be used. The fractionating tower 80 is configured to separate carbon dioxide and the hydrogen sulfide and supply them in liquid form as the second stream 81 at the discharge 82. Even though a substantial amount of carbon dioxide is removed in stream 81 (Table 1) at the discharge 82, the first stream or output 98 nonetheless contains carbon dioxide gas. The methanol removal system 94 and, more particularly, the methanol absorber 120 is thus provided to remove the retained carbon dioxide in the first stream 98 as discussed hereinafter.

The stream 81 at discharge 82 from the fractionation tower 80 is supplied to a reboiler 84 that operates to elevate the temperature enough to boil some of the lighter gases and, in turn, to recapture some methane, helium, nitrogen, and other gases and re-supply them as gases 83 to the fractionation tower 80 for additional processing and concentration in the first stream or output 98. The vapor output of the reboiler 84 is connected back to the tower 80; and the liquid stream 46 that is over 90% carbon dioxide is ready for disposal. The liquid stream 46 is supplied to the injection system 28 where it is pressurized by one or more pumps 50 and supplied at an elevated pressure, which in this application is a pressure of about 3500 pounds per square inch absolute (psia), to the injection well 52 via pipeline 54. In the following Table 1 and Table 2, the pressure, temperature, and general make up of the various streams, as discussed above, are tabulated for the produced gas 31 and 34 being supplied by the producing well 12 that is used to exemplify the inventions herein disclosed. It should be understood that different producing wells and producing wells in different fields will yield produced gas which will have some different gases and gases in different ratios. Such produced gas is to be processed consistent with the principles evident from the disclosed example.

TABLE 1

Stream Composition, Temperature, and Pressure

| Stream Fluid No. | Temp °F. | Press PSIA | $CH_4$ % | $N_2$ % | $CO_2$ % | He % | $H_2S$ % | Propane 5 | Methanol % |
|---|---|---|---|---|---|---|---|---|---|
| 34 | 85 | 660 | 18.7 | 7.3 | 69.7 | 0.6 | 3.5 | 0.1 | |
| 42 | −38 | 659 | 18.7 | 7.3 | 69.7 | 0.6 | 3.5 | 0.1 | |
| 44 | −35 | 650 | 69.1 | 28.5 | ~0 | 2.34 | 0.02 | 0 | |
| 46 | 46 | 655 | 1.33 | 0.006 | 93.7 | ~0 | 4.7 | 0.134 | 0.016 |
| 60 | 91 | 3500 | 1.33 | 0.006 | 93.7 | ~0 | 4.7 | 0.134 | 0.016 |
| 81 | 42.5 | 655 | 2.14 | 0.014 | 93.08 | ~0 | 4.49 | 0.126 | 0.013 |
| 83 | 46 | 655 | 5.14 | 0.04 | 90.82 | ~0 | 3.72 | 0.095 | 0.002 |
| 98 | −35 | 654 | 47.9 | 17.9 | 31.4 | ~1.42 | 1.27 | 0.04 | |
| 103 | −38 | 650 | 0 | 0 | ~0 | 0 | 0.09 | 0 | 99.9 |
| 108 | 120 | 659 | 15.17 | 1.58 | 79.71 | 0.006 | 3.2 | 0.09 | 0.07 |
| 125 | 6.5 | 650 | 2.98 | 0.31 | 15.67 | ~0 | 0.7 | 0.018 | 80.28 |
| 127 | −10.8 | 110 | 30.24 | 3.4 | 64.9 | 0.013 | 1.07 | 0.06 | 0.1 |
| 134 | −23 | 90 | 15.2 | 1.6 | 80 | 0.006 | 3.2 | 0.09 | 0.07 |
| 147 | −10.8 | 110 | 0.33 | 0.008 | 10.87 | ~0 | 0.67 | 0.13 | 88.1 |
| 165 | 154.5 | 89 | 2.01 | 0.05 | 73.01 | ~0 | 4.67 | 0.09 | 20.07 |
| 167 | −30 | 89 | 0.029 | ~0 | 20.36 | ~0 | 3.84 | 0.034 | 75.7 |
| 171 | −30 | 89 | 2.72 | 0.07 | 91.95 | ~0 | 4.96 | 0.11 | .046 |

TABLE 1-continued

Stream Composition, Temperature, and Pressure

| Stream Fluid No. | Temp ° F. | Press PSIA | CH$_4$ % | N$_2$ % | CO$_2$ % | He % | H$_2$S % | Propane 5 | Methanol % |
|---|---|---|---|---|---|---|---|---|---|
| 175 | 244.3 | 89 | 0 | 0 | 0.029 | 0 | 1.93 | ~0 | 98.03 |
| 177 | 244.3 | 89 | 0 | 0 | ~0 | 0 | 0.09 | 0 | 99.9 |

The methanol removal system 94 includes the methanol absorber 120 which receives gas 98 from supply line 96 and passes the gas 98 through a cascading flow of methanol supplied from a methanol recycle line 104. The methanol absorber 120 strips out the carbon dioxide and in turn has a hydrocarbon output 122 that supplies a hydrocarbon stream which has also been termed a first stream 44 through pipe 124 to a second gas separation system 30 as discussed hereinafter. The methanol strips out the carbon dioxide in the methanol removal system 94; and the methanol with carbon dioxide 125 is supplied through a discharge line 126 to a methanol recovery system 100 which includes a methanol flash chamber 128. In the flash chamber 128, the pressure is reduced to about 110 psia so that the carbon dioxide flashes off. It is supplied as a gas 127 via a return line 129 through mixer 130 and through the heat exchanger 24 via another return line 132. In the heat exchanger 24, the carbon dioxide composition 108 is heated from about −23° F. to about 100° F. Thereafter, the carbon dioxide composition 108 is supplied via line 144 to a plurality of compressors such as compressors 136 and 138 to increase the pressure for reintroduction into the fractionation tower 80. In turn the temperature is increased. Coolers like air coolers 140 and 142 are used to keep the temperature under control and in a desired range. The carbon dioxide 108 is thereafter supplied to the fractionation tower 80 via line 146 for further separation to recover more hydrocarbons in stream 98 and to increase the carbon dioxide removed through discharge 82.

The methanol flash chamber 128 supplies the methanol 147 through flash chamber outlet 148 and via line 149 as a liquid to a counter-current heat exchanger 150 which operates to cool the methanol in line 152. The methanol is moved by pump 154 through line 156 to the heat exchanger 24 where it is heated from about 2° F. to about 38° F. and then supplied to a methanol make-up tank 158. The methanol is then supplied via line 104 to the methanol absorber 120. A separate or external supply of methanol is provided to the methanol make-up tank 158 via line 159 to replace whatever methanol that is lost through system operations.

The counter-current heat exchanger 150 also supplies a methanol mixture mostly in gas form, but with some liquids, to a methanol stripping system 159 that includes a methanol stripper tower 160 via line 162. The methanol stripper tower 160 is a fractionation tower that separates any retained carbon dioxide from the methanol. The separated carbon dioxide 165 is then supplied via line 163 to a cooler 164 and condenser 166. Liquids 167 are returned to the stripper 160 for reprocessing via line 168. The carbon dioxide gas 171 is supplied via line 170 to the mixer 130 for reintroduction to the fractionation tower 80 as discussed hereinbefore. Recovered methanol is hot (about 240° F.) and is recycled or processed through a discharge line 172 to a reboiler 174. The reboiler 174 further heats the recovered methanol to extract gases 175 for reprocessing in the methanol stripper tower 160. The reboiler 174 separates the methanol as a liquid 177 for transmission via line 176 to the counter-current heat exchanger 150 for recycling back to the methanol absorber tower 120. The reboiler 174 receives heat 173 from any suitable other line of fluid or gas or from a separate source. Liquid condensate from the condenser 166 may be circulated via line 178 to the reboiler 84 associated with the fractionation tower 80 to supply heat.

In FIG. 2, it can also be seen that a supply of nitrogen is optionally supplied via line 72 from the nitrogen separator as hereinafter discussed to line 88 for reintroduction to the fractionation tower 80. The nitrogen supplied has characteristics such that it will replace methane in the liquid phase in the fractionation tower 80 to enhance the methane recovery in the supply line 96.

In FIG. 2, it can be seen that the heat exchanger 24 transfers heat between different streams to conserve energy and reduce cost. The heat exchanger 24 is arranged with several flow channels to effect the desired heating and cooling. Notably, the propane 114 supplied via line 116 is a primary coolant. A separate cooling system is used to cool propane 114 and supply it as a coolant. At the same time another propane stream 117 is provided for similar purposes. In FIG. 2, it is received as a source of heat so that its temperature lowers from about 100 to 105° F. to at or below 60° F. after it leaves the heat exchanger 24 via discharge line 118.

Figure 3:
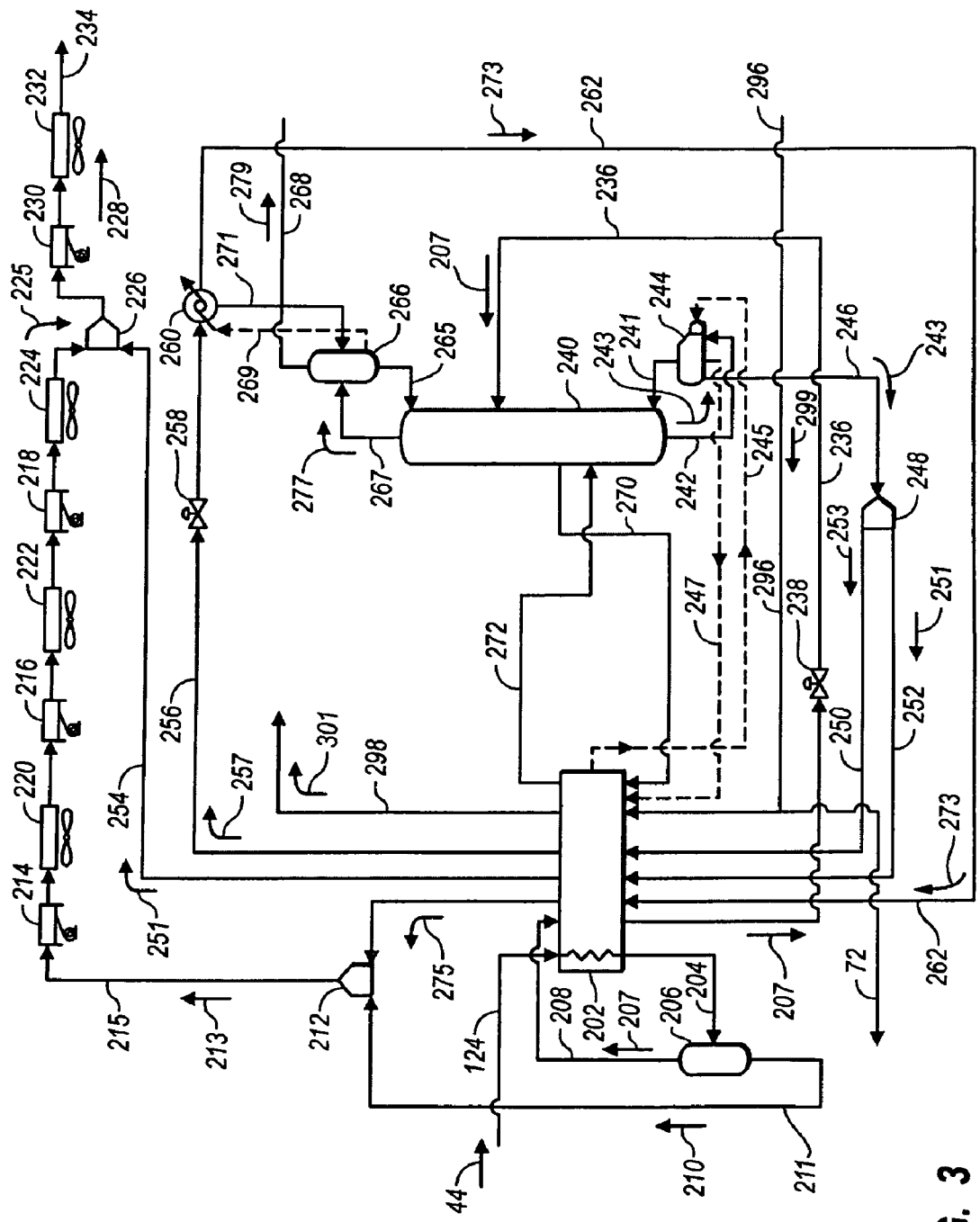
FIG. 3 is a partial system diagram of the systems to separate hydrocarbons from other gases of the system of FIG. 1.

In FIG. 3, the hydrocarbon stream 44 is supplied via line or pipe 124 to a heat exchanger 202. The stream 44 is cooled from about 100° F. to about −30° F. (30 degrees below zero, Fahrenheit) and supplied via a line 204 to a separator 206. The separator 206 removes the nitrogen and helium gas and supplies it as stream 207 (Table 2) back to the heat exchanger 202 via line 208. The liquid hydrocarbon stream 210 is supplied via line 211 to a mixer 212 where it is vaporized and combined with additional recovered hydrocarbons, if any, as hereinafter discussed. The combined stream 213 is supplied via line 215 to a one or more compressors like compressors 214, 216, 218 which together increase the pressure to about 285 psia. The related coolers 220, 222, 224 cool the gas after compressive heating. Thereafter, the hydrocarbon stream 225 is supplied to a mixer 226 for mixing with additional recovered hydrocarbons to form sales stream 228, which is pressurized and cooled by a compressor 230 and cooler 232 for delivery as the natural gas output 234 of the system 10.

TABLE 2

Stream Composition, Temperature, and Pressure

| Stream Fluid No. | Temp ° F. | Press PSI | CH$_4$ % | N$_2$ % | CO$_2$ % | He % | H$_2$S % | Methanol % |
|---|---|---|---|---|---|---|---|---|
| 207 | −30 | 646 | 69.1 | 28.47 | ~0 | 2.34 | 0.024 | 0.009 |
| 215 | 90 | 17.86 | 96.88 | 3 | ~0 | 0 | 0.034 | 0.013 |
| 225 | 120 | 285 | 96.88 | 3 | ~0 | 0 | 0.034 | 0.013 |
| 228 | 120 | 415 | 96.88 | 3 | ~0 | 0 | 0.03 | 0.013 |
| 241 | −167.5 | 295.1 | 88.55 | 11.44 | ~0 | 0 | 0.003 | |
| 243 | −171.9 | 295.1 | 94.86 | 5.05 | ~0 | 0 | 0.026 | 0.01 |
| 251 | −167.5 | 295.1 | 96.88 | 3 | ~0 | 0 | 0.034 | 0.013 |
| 253 | −167.5 | 295.1 | 96.88 | 3 | ~0 | 0 | 0.034 | 0.013 |
| 257 | −240 | 293.1 | 96.88 | 3 | ~0 | 0 | 0.034 | 0.013 |
| 273 | −254.3 | 18.86 | 96.88 | 3 | ~0 | 0 | 0.034 | 0.013 |
| 275 | 90 | 17.86 | 96.88 | 3 | ~0 | 0 | 0.034 | 0.013 |
| 277 | −244.7 | 294.9 | 5.45 | 90.99 | | 3.56 | 0 | 0 |
| 279 | −252.3 | 294.9 | 2 | 90 | 0 | 8 | 0 | 0 |

TABLE 2-continued

Stream Composition, Temperature, and Pressure

| Stream Fluid No. | Temp ° F. | Press PSI | CH$_4$ % | N$_2$ % | CO$_2$ % | He % | H$_2$S % | Methanol % |
|---|---|---|---|---|---|---|---|---|
| 281 | −300 | 292.9 | 2 | 90 | 0 | 8 | 0 | 0 |
| 285 | −300 | 292.9 | 0.032 | 18.1 | 0 | 81.86 | 0 | 0 |
| 293 | −254.5 | 292.9 | 0.57 | 92.15 | 0 | 7.28 | 0 | 0 |
| 297 | −254.5 | 292.9 | 2.21 | 97.5 | 0 | 0.26 | 0 | 0 |
| 299 | −299.5 | 19.5 | 2.21 | 97.5 | 0 | 0.26 | 0 | 0 |
| 301 | 70 | 15.5 | 2.21 | 97.5 | 0 | 0.26 | 0 | 0 |

The nitrogen and helium mixture 207 is cooled to around −200° F. and supplied from the heat exchanger 202 via line 236 and regulating valve 238 to the nitrogen rejection unit 240. The nitrogen rejection unit 240 is a fractionating tower with about 18 trays or some other suitable device to remove nitrogen from the hydrocarbons, including, specifically, methane. The nitrogen rejection unit 240 has a discharge 242 that supplies a liquid stream 243 through a reboiler 244 for transmission through line 246 to a splitter 248. The reboiler 244 receives heat from a suitable fluid supplied from the heat exchanger 202 via line 245, which is returned to the heat exchanger 202 via line 247. The reboiler 244 heats the stream 243 from about −171° F. to about −167.5° F. to separate out a small stream 241 that is returned to the nitrogen rejection unit 240 for reprocessing to increase the rejection of nitrogen. The splitter 248 thereafter supplies most of hydrocarbon stream 251 to the heat exchanger 202 via line 252 and the remainder in stream 253 via line 250. The stream in line 252 is heated to about 90° F. in the heat exchanger 202 and thereafter connects to line 254. Line 254 supplies the heated stream as a gas to the mixer 226 where it is combined with the stream 225 to form the stream 228 which is the stream of hydrocarbons for sale. Line 250 is connected to line 256 which connects to a regulator valve 258 and a condenser 260. The stream 257 in line 256 was cooled in the heat exchanger 202 to about −240° F. (240 degrees below zero, Fahrenheit) where it is further cooled through a Joule Thompson expansion valve 258 following which it is transmitted to condenser 260. The condensing fluid is supplied by a tank 266 via lines 269 and 271. The fluid 273 is heated and then is supplied at a reduced pressure to the heat exchanger 202 via line 262, where it is heated to a temperature of about 90° F., and then supplied as gas 275 to the mixer 212 for combination with the stream 210 to form stream 213.

The nitrogen and helium stream 277 separated in the nitrogen rejection unit 240 is supplied via line 267 to a condenser 266 where some liquids are condensed out and returned to the separator 240 via line 265. The gas 279 is then supplied to the helium recovery unit 278 (FIG. 4) via line 268. The hydrocarbons are separately cycled through the heat exchanger via lines 270 and 272 to control the liquid/gas mix of the hydrocarbons. The reboiler 244 is separately heated by a stream from the heat exchanger 202. The reboiler 244 extracts nitrogen from the discharge 242 and supplies it to the nitrogen rejection tower 240 for continued processing.

Figure 4:
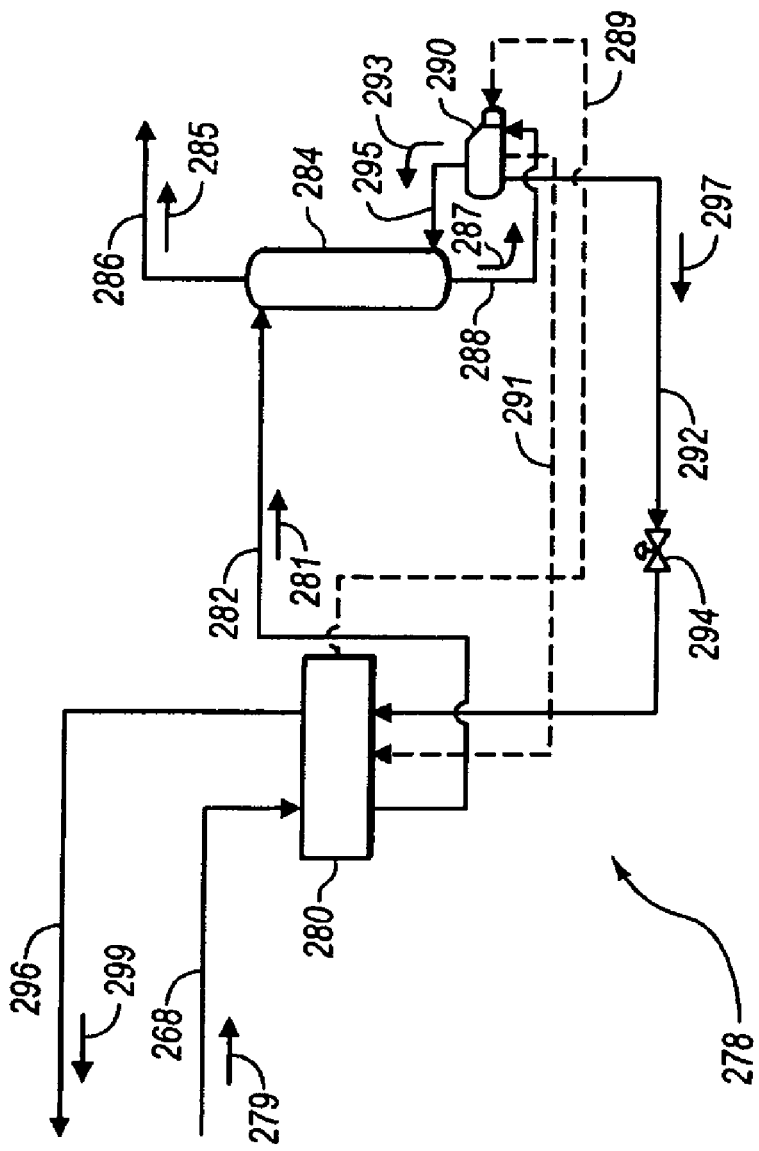
FIG. 4 is a partial diagram of a system to separate helium and nitrogen of the system of FIG. 1.

The helium and nitrogen stream 279 is supplied via line 268 to a heat exchanger 280 in FIG. 4 to further cool the stream to −300° F. (300 degrees below zero, Fahrenheit), a temperature where the nitrogen is mostly liquid and the helium is in vapor form. The stream 281 is then supplied via line 282 to a separation tower 284 in which the helium 285 is removed and supplied via line 286 to a helium sales system. The nitrogen stream 287 is extracted via the discharge 288 and supplied to a reboiler 290 which receives a heating fluid from the heat exchanger 280 via lines 289 and 291. A suitable pump may be provided if natural circulation is insufficient.

The reboiler 290 heats the discharge stream 287 to recover, among other things, additional helium 293 and return it to the recovery unit 284 via line 295 for further separation. The nitrogen 297 is supplied from the reboiler 290 in liquid form to line 292. The nitrogen output 297 is supplied via the line 292 through a regulator valve 294 to reduce the line pressure to about 20 psia and thereby reduce the temperature even further to about −315° F. (315 degrees below zero, Fahrenheit). Thereafter the stream 297 is supplied to the heat exchanger 280 where it is heated back to about −300° F. (300 degrees below zero, Fahrenheit) and then supplied as a gas 299 in line 296 where it connects to line 72 for further deliver to the fractionation tower 80 in FIG. 2 and for further processing through heat exchanger 202 where it is raised in temperature to about 70° F. Unused nitrogen 301 is then vented via line 298.

Returning to FIG. 2, it should be understood that the produced gas 34 being supplied to the heat exchanger 24 for the system illustrated is essentially free of natural gas liquids (NGL). Produced gas from some fields may have entrained NGL which can be removed and sold to increase the hydrocarbon recovery from the produced gas 34. For example, in FIG. 2, the produced gas 34 may be processed through a system 310 (shown in dotted line) to recover the NGL before the produced gas is further processed as hereinbefore discussed. Specifically the produced gas 34 coming into the heat exchanger 24 via line 36 is cooled by the heat exchanger 24 but only to about 10° F. to about −10° F. for delivery via line 312 to a separator 314. The separator 314 separates the NGL and supplies them via line 316 to a suitable separation system 318. The NGL are then available for sale and/or for further processing into suitable hydrocarbon products. The dehydrated produced gas with the NGL removed 320 is then returned to the heat exchanger 24 through line 322 where is cooled to the desired −38° F. (38 degrees below zero, Fahrenheit) and then supplied to line 38 via line 324 as the dehydrated cooled produced gas 42 for processing by the processor 26 as hereinbefore discussed.

It should be understood that the system 10 and more particularly the systems of FIGS. 2-4 are simplified with many line filters, valves, temperature detectors, flow detectors, pressure detectors, and the like not shown. Such components are obviously needed as those skilled in the art would recognize. In addition, drains and drain valves, pressure relief valves, recirculation lines, pumps, and other components and operating features that are known to those skilled in the art are also not shown to simplify the drawings. Further, it should be understood that the streams of materials (e.g., gases and liquids) in the illustrated samples move by any suitable or appropriate pipe means which are stated or identified as pipes or lines. While any suitable pipe structure may be used, it is expected that the pipes will be different grades, sizes and types of pipes selected in relation to the material to flow therein. For example, the pipe means or conduit to move the waste material at 3500 psia to the injection well will be selected to withstand the pressure and also be of a material that resists corrosion due to the hydrogen sulfide in the stream.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A process comprising:

obtaining produced gas from a source of produced gas, said produced gas including at least one hydrocarbon gas and at least one waste gas;

supplying an inlet system for dehydrating the produced gas;

supplying a heat exchanger to cool produced gas after dehydration;

supplying a gas processing system for separating gases of the produced gas after cooling;

supplying said produced gas to said inlet system and operating said inlet system to dehydrate the produced gas and form dehydrated produced gas;

supplying said dehydrated produced gas to said heat exchanger to cool said dehydrated produced gas to form at least one waste liquid from at least one waste gas and to form cooled dehydrated produced gas having at least one at least one waste liquid entrained therein;

supplying said cooled dehydrated produced gas with entrained at least one waste liquid to a gas processing system and operating said gas processing system to separate said cooled dehydrated produced gas into at least a hydrocarbon stream and said waste liquid, said hydrocarbon stream including at least carbon dioxide gas and methane and said waste liquid including at least carbon dioxide liquid;

processing said hydrocarbon stream to separate said carbon dioxide gas and said methane, returning said carbon dioxide gas for incorporation with dehydrated gas and supplying said methane as an hydrocarbon output;

supplying pressurizing means for pressurizing a stream;

operating said pressurizing means to pressurize said waste liquid;

supplying said waste liquid under pressure to an injection well; and injecting said waste liquid into said injection well.

2. The process of claim 1 wherein said heat exchanger is positioned next in sequence after said inlet system.

3. The process of claim 2 wherein said produced gas includes hydrogen sulfide and wherein said processing system is operated so that hydrogen sulfide is included in said waste liquid.

4. The process of claim 3 further including supplying a methanol removal system with methanol, and wherein said hydrocarbon stream is supplied to said methanol removal system, and wherein said methanol removal system is operated to combine the carbon dioxide gas with the methanol to remove the carbon dioxide gas from said hydrocarbon stream to form a methanol and carbon dioxide liquid.

5. The process of claim 4 further including supplying a methanol recovery system operable to separate the methanol and carbon dioxide liquid into methanol and carbon dioxide gas, and wherein said methanol and carbon dioxide liquid are supplied to the methanol recovery system, and wherein said methanol recovery system is operated to separate said carbon dioxide from said methanol to form a methanol liquid and carbon dioxide gas, and wherein said methanol recovery system is connected to supply the carbon dioxide gas for combination with the cooled dehydrated production gas being processed.

6. The process of claim 5 wherein the methanol is supplied to the methanol removal system.

* * * * *